US006788827B1

(12) United States Patent
Makram-Ebeid

(10) Patent No.: US 6,788,827 B1
(45) Date of Patent: Sep. 7, 2004

(54) IMAGE PROCESSING METHOD AND SYSTEM FOR FOLLOWING A MOVING OBJECT FROM ONE IMAGE TO AN OTHER IMAGE SEQUENCE

(75) Inventor: Shérif Makram-Ebeid, Dampierre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/671,892

(22) Filed: Sep. 28, 2000

(30) Foreign Application Priority Data

Sep. 30, 1999 (EP) .......................................... 99402392

(51) Int. Cl.[7] .............................................. G06K 9/36
(52) U.S. Cl. ................................................... 382/276
(58) Field of Search ............................... 382/276, 278, 382/291, 293, 128, 100, 132; 356/614; 128/922

(56) References Cited

U.S. PATENT DOCUMENTS 5,293,574 A * 3/1994 Roehm et al. ............. 378/98.2

FOREIGN PATENT DOCUMENTS

EP 0609709 A2 7/1994 ........... G06F/15/70

OTHER PUBLICATIONS

Automatic contour detection by encoding knowledge into active contour models, by Gerad et al, IEEE 1998.*
Gros P et al: "Using Local Planar Geometric Invariants to Match and Model Images of Line Segments" Computer Vision and Image Understanding, US, Academic Press, vol. 69, No. 2 Feb. 1, 1998, pp. 135–155.
"Representing Moving Images with Layers" by John Y.A. Wang and Edward H. Adelson in IEEE Transactions on Image Processing, vol. 3, No. 5, Sep., 1994, pp. 625–638.

* cited by examiner

Primary Examiner—Samir Ahmed
Assistant Examiner—Vikkram Bali
(74) Attorney, Agent, or Firm—John F. Vodopia

(57) ABSTRACT

An image processing method for processing the images of an image sequence (S) comprising steps of determining image data related to first points of an Object of Interest observed in a first image, said Object of Interest having possible movements, and image data related to correlated points found in a second image of the sequence, and based on said image data, of estimating parameters of sets of transformation functions (400), which transformation functions transform said first points into said correlated points and, from said parameters, of determining one Warping Law (500) that automatically transforms said given Object of Interest of the first image into the same object in the second image of the sequence for following and locating (600) said Object of Interest in said second image of the sequence.
Application: Medical imaging, X-ray examination apparatus

13 Claims, 7 Drawing Sheets

IMAGE PROCESSING METHOD AND SYSTEM FOR FOLLOWING A MOVING OBJECT FROM ONE IMAGE TO AN OTHER IMAGE SEQUENCE

BACKGROUND OF THE INVENTION

The invention concerns an image processing method and system for following a moving object from one image to an other in an image sequence. The invention also concerns an X-ray examination medical apparatus using said system and method.

The invention finds applications in the industry of medical imaging.

SUMMARY OF THE INVENTION

An image Processing Method for Representing Moving Images is already known from the publication entitled "Representing Moving Images with layers", in IEEE TRANSACTIONS ON IMAGE PROCESSING, VOL.3, No. 5, SEPTEMBER 1994, by John Y. A. Wang and Edward H. Adelson.

In order to avoid encoding images using high-level machine vision concepts such as 3-D object recognition, this publication proposes an image coding system which involves an image representation based on superimposed image layers. This publication further proposes to apply such a representation to the coding of video sequences. In digital systems, complex motions such as affine transformations including combinations of translation, rotation, dilation and shear, may be used. Such a representation involves an adequate description of the motions in a first sequence. For instance, motion of a hand waving on a moving background is studied. Then, given this first sequence, it is searched to invert the process by which the motions have been generated. To that end, the sequence is decomposed into a set of layers which may be compounded so as to generate said first sequence. Each layer comprises an intensity map, an opacity or transparency map referred to as alpha map and a velocity map. In addition the layers are assumed to be ordered in depth. The intensity map and alpha map are warped together. A delta map may also be allowed, for serving as an error signal to update the intensity map over time. Once a description in terms of layers is given, the image sequence may be straight forward generated. The difficult part is determining the layered representation given the input sequence. There, synthesis is easy, but analysis is hard. The representation is mono-unique. There will be many different descriptions that lead to the same synthesized image sequence. Thus, a layered representation can serve to specify the decoding process, while the encoding process remains open to further improvement by individual users.

In the cited publication, it is proposed, for solving the analysis problem, to simplify the representation in such ways as the alpha channel is binary, and there are no delta maps used. It is important to note from the cited publication, that-the method is assumed to be applied to stable objects undergoing smooth motions; that, in the images, which are binary, the objects are either completely transparent or completely opaque; that the velocity maps are restricted to affine transformations.

The solution proposed in the cited publication is not appropriate to medical image processing. A problem is that, in the field of medical imaging, some objects represented in images, for instance in X-ray images, do not move at all; some other objects periodically dilate so their walls have no smooth motion. Thus, they may not be defined as stable objects having smooth motions and they are not allowed to be segmented based on information related to their motion. An other problem is that the objects are translucent and, especially in an X-ray images, they are never completely transparent or completely black, but instead, several organs are seen through one another while superimposed. So, these organs of the image are not allowed to be represented by binary intensity values.

An aim of the invention is the improvement of medical images in order to make easier the visualization of objects in those images and further make easier the diagnosis of the practitioner based on said images. So, it is an aim of the invention to provide means for automatically following a given object of interest from one image to another in an image sequence. In medical applications, following automatically an organ, for instance defined by its contour, may be very useful for a physician in order to analyze the movements of said organ. But organ contours are often very fuzzy in the images so that following an organ location from one image to an other in the sequence may be difficult for the physician. For instance, it is very useful to follow the movements of the heart left ventricle in order to identify and localize abnormalities. But the heart left ventricle movements are especially difficult to follow because the heart left ventricle contour has no smooth movements and is situated in a cluttered environment formed by other organs having their own movements.

This aim is reached by a method according to Claim 1. Such a method is favorably carried out by a system according to Claim 11. Such a system may be favorably associated to an X-ray examination medical apparatus according to Claim 12.

An advantage of the invention is that the method or system may be carried out successfully even in the case when the object of interest to be followed between two images of a sequence is a translucent object having a fuzzy contour represented in a cluttered environment. An other advantage is that the method is robust so that the object of interest may be followed automatically throughout a whole image sequence, basing the process on one image to go to the next image and so on from the last processed image to the next, until the end of the image sequence is reached. An other advantage of the invention is that it is not limited to be applied to an image sequence representing an object having smooth movements uniquely described by affine functions: the object may have any movements described by a parametrical function.

BRIEF DESCRIPTION OF THE DRAWINGS

The embodiments of the invention are described hereafter in detail in reference to diagrammatic figures, wherein.

DESCRIPTION OF THE PREFERRED EMBODIMENTS

The invention concerns an image processing method, and a system for carrying out this method, for locating and following an Object of Interest in an image sequence. This Object of Interest may be a translucent object having a fuzzy contour moving in a cluttered environment BG. The invention also concerns an X-ray apparatus having such a system.

Figure 7:
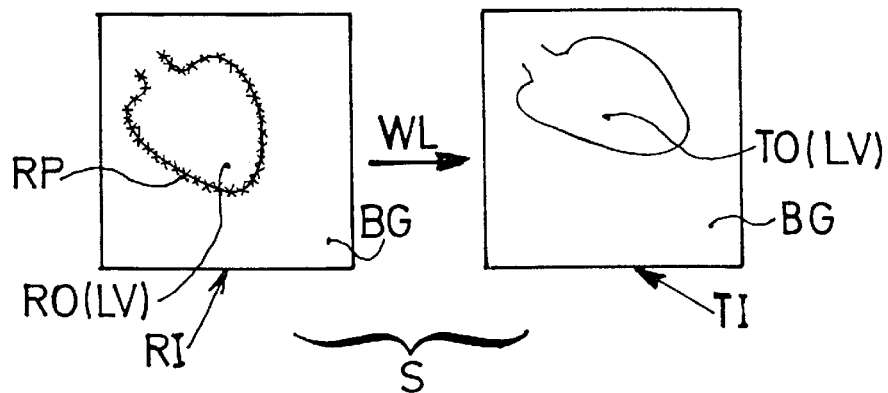
FIG. 7 illustrates a sequence of images to be processed.

In reference to FIG. 7, the image sequence S has at least a first image referred to as Reference Image RI and a second image referred to as Target Image TI. The Reference Image may be for instance a virtual image such as a CAD image or may be an image actually anterior to the Target Image of the sequence. The invention concerns more particularly medical images, such as for instance X-ray images, where several organs are represented forming respectively superimposed translucent objects. In the image sequence, some of the objects may have no movement, some others may have compounded movements. According to the method of the invention, a Reference Object RO is studied and its location is determined in the Reference Image RI. Then, a Target Object TO, which is similar to said Reference Object RO, is to be found in the Target Image TI by application of one Warping Law WL to said Reference Object RO of the Reference Image RI. As a matter of fact, the Target Object is the same object as the Reference Object after possible movements, which is observed in a Target Image with respect to the Reference Image.

Figure 1:
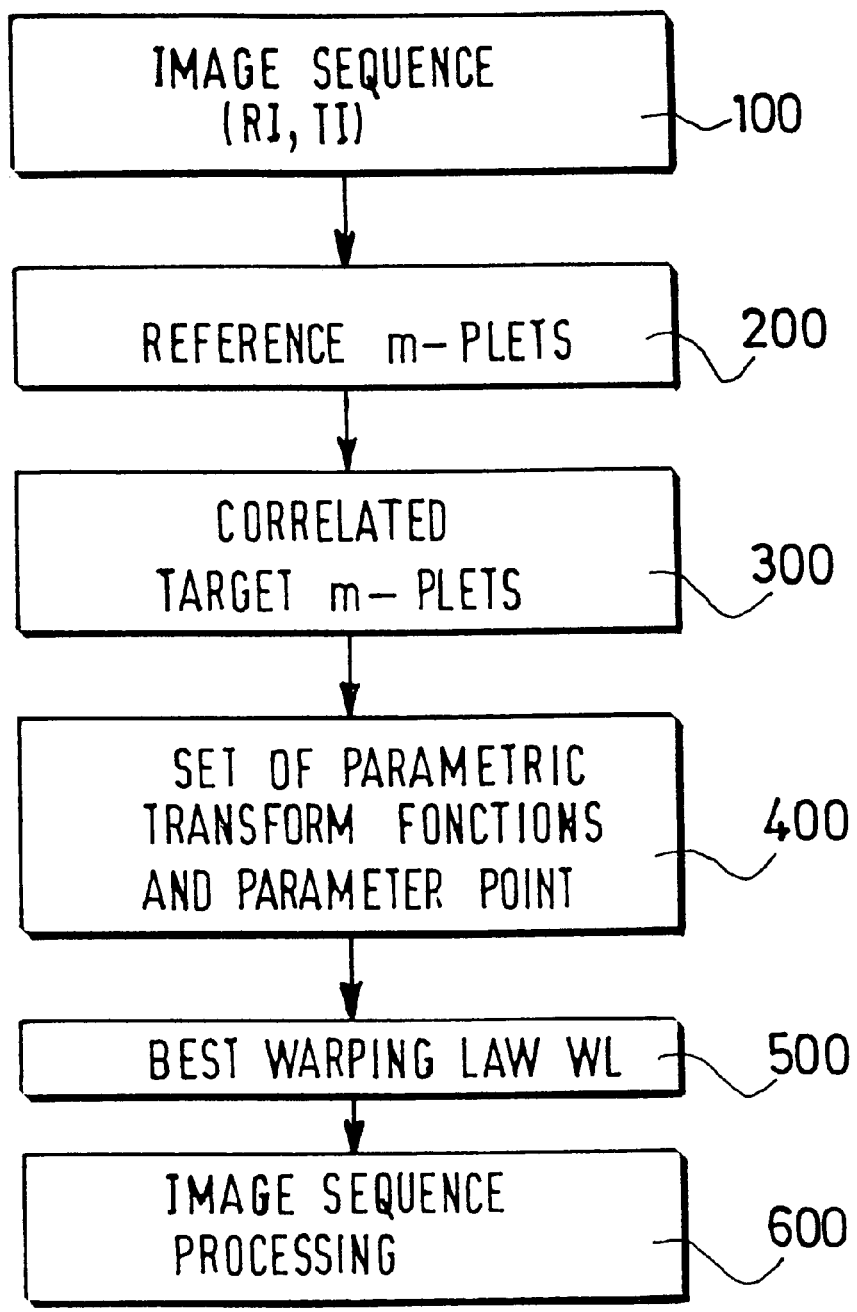
FIG. 1 is a functional block diagram of the main steps of the method.

In reference to FIG. 1, this method comprises main steps of:

acquisition 100 of the image data of an image sequence S including a Reference Image RI representing an Object of Interest referred to as Reference Object RO and a Target Image TI where the Object of Interest is to be followed, then referred to as Target Object TO;

determination 200 of sets of m-plets of specific points referred to as Key-Points RKP of the Reference Object RO in RI. The m-plets may be triplets or quadruplets of points depending on the dimensions of the image space, which may be 2-D or 3-D;

determination 300 of sets of m-plets of points referred to as Key-Points TKP of the Target Image TI, which are correlated to the Reference m-plets Key-Points;

determination 400 of a number of pairs of correlated m-plets and of sets of parametric functions related to each pair of correlated m-plets: each parametric function transforms the Key-Points of one Reference m-plet into the correlated Key-Points of one pair of m-plets;

determination 500 of the best Warping Law WL: The solution of each set of parametric transformation functions provides one set of parameters for determining one Parameter Point in a multidimensional space; a set of a number of pairs of m-plets provides a set of the same number of Parameter Points, which is first sub-sampled; a Best Warping Law is determined by a Mutual Information Technique applied to a set of candidate Warping Laws formed from said sub-sampled set of Parameter Points;

transformation 600 of the Reference Object RO into the looked for corresponding Target Object TO using the Best Warping Law.

The advantages of this method include that said Warping Law WL is a parametric function of any form, such as a first degree, second or more degree function, which is determined as soon as its parameters are estimated. This function is not at all limited to an affine function. Also, said Warping Law is not limited to the description of 2-D movements in a 2-D space. This Warping Law may describe 3-D movements in a 3-D space. So, the method comprises steps of estimating the parameters of the best possible Warping Law for applying said Warping Law to a Reference Object RO in the Reference Image RI to provide a corresponding Target Object TO in the Target Image TI, which Target Object TO is the transformation of the Reference Object RO by said Warping Law WL.

Figure 2:
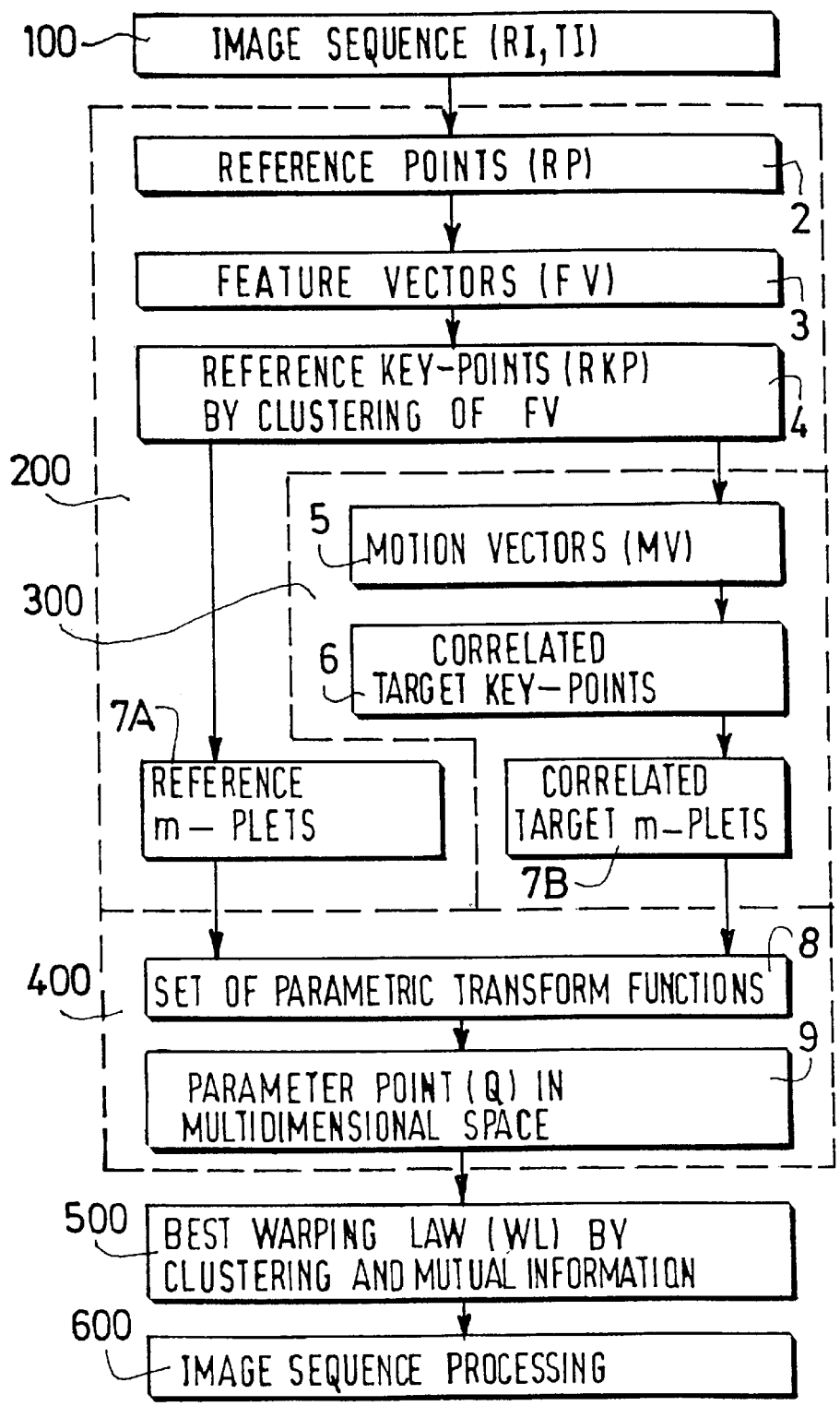
FIG. 2 is a functional block diagram of detailed steps of the method.

Referring to FIG. 2, step 200 of the method comprises detailed steps of:

Image segmentation 2 performed in said Reference Image RI of the image sequence S: In this step, Reference Points RP of a Reference Object RO are determined according to any technique known of those skilled in the art, for example by segmentation of the Reference Object. Those Reference Points may be chosen among contour points or internal points of the Reference Object. The number of Reference Points may be several tens. In reference to FIG. 7, which represents schematically an X-ray Reference Image RI with a Reference Object RO that is the heart left ventricle LV, numerous contour points are represented as an example and taken as Reference Points RP. By this segmentation, the object RO, which may be translucent, i. e. non binary, is characterized by the co-ordinates and intensities of all its points at the resolution of the Reference Image RI and by a set of Reference Points RP whose also co-ordinates and intensities are measured.

Characteristic Feature Vector FV estimation 3 in the Reference Image RI: For each Reference Point RP, characteristic features are estimated; for example, each Reference Point RP is characterized by its coordinates $X_R$, $Y_R$ in a 2-D Reference Image RI, or $X_R$, $Y_R$, $Z_R$ in a 3-D Reference Image RI, its intensity level $I_R$ and at least an other feature haracteristic of its local environment in the Reference Image RI, such as its intensity gradient vector direction. A Feature Vector FV is formed, based on these characteristic features at each Reference Point RP of the Reference Object RO in the Reference Image RI. The Feature Vector FV may not be limited to the above cited features: it may comprise for instance, besides the co-ordinates of the Reference Point, the image gradient at this point and the image second derivatives at this point.

Selection 4 of representative points, among the Reference Points, referred to as Reference Key-Points RKP, in the Reference Image RI. In this step, the Reference Points RP are sub-sampled and the representative Reference Key-Points are determined by using a Clustering Technique. The Reference Points RP that have similarities of signatures, i.e. of Feature Vectors FV, are associated into Classes, so as these Classes be related to closely packed Feature Vectors, which means related to respective specific zones of the Reference Object that are no-ambiguously distinct from one another. The Clustering Technique step partitions the Feature Vectors, which are data points, into a given number of Classes, each composed of closely spaced Feature Vectors, whereas the Classes are as far spaced as possible from each other. This Clustering Technique 4 comprises a sub-step referred to as robust K-means algorithm and a further sub-step of Ascending Hierarchical Classification AHC.

Figure 3:
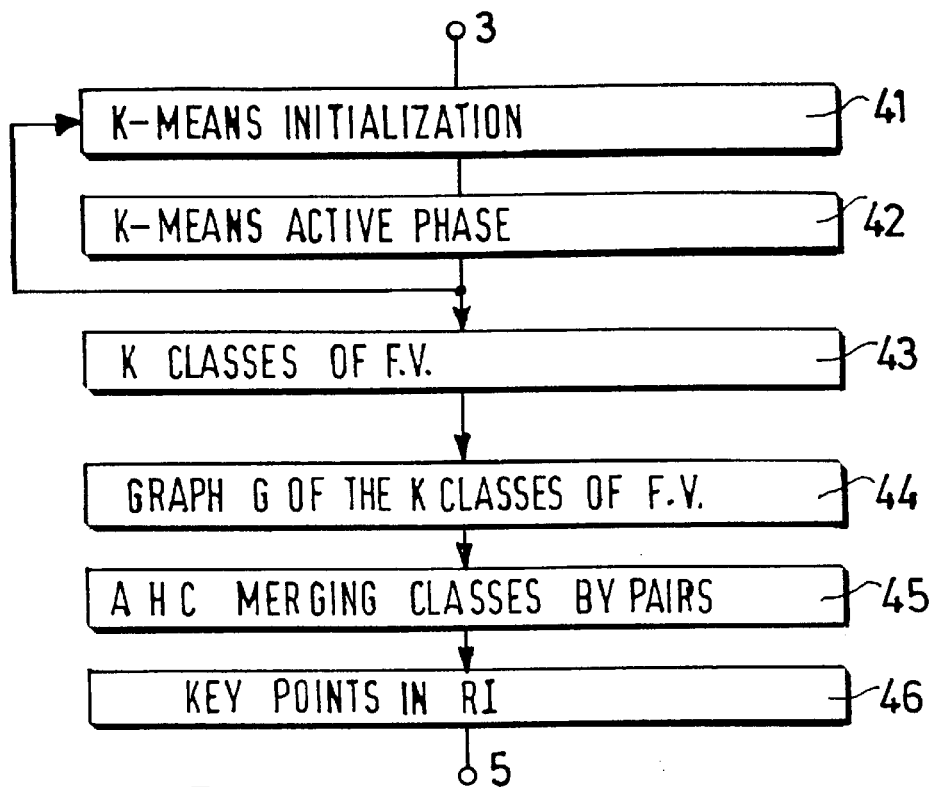
FIG. 3 is a functional block diagram of K-means and AHC steps of the method.

In reference to FIG. 3, the K-means algorithm comprises two phases 41, 42. In an initialization phase 41, given the set of Feature Vectors for all the Reference Points, and a number K of Classes in which it is wanted to split them, K Feature Vectors are selected, which are referred to as representative of the Classes. Then, each Feature Vector of the set is associated to one of said K representative Feature Vectors by minimization of a clustering criterion, thus forming K classes. This criterion may be based on the quadratic distance between a Feature Vector and the representative of the Class.

Then, in an active phase 42, the barycenter of each Class is determined and the minimization of the clustering criterion is again used now based on the quadratic distance between each Feature Vector and the barycenter of each Class, which provides K new Classes. These two phases 41, 42 are iterated. In order to eliminate unrealistic values, maximum distances are imposed between the Feature Vectors and the barycenter in the active phase 42 of the algorithm. The maximum allowed distance and the number of iterations may be predetermined, so the maximum size allowed for the Classes may be calculated at each iteration supposing that this size is reduced at each iteration.

Iteration of these two phases 41, 42 is a very robust algorithm of the K-means type which delivers the K classes in step 43.

The Ascending Hierarchical Classification algorithm AHC comprises two operations and is designed to minimize the number of first found K Classes.

Figure 8:
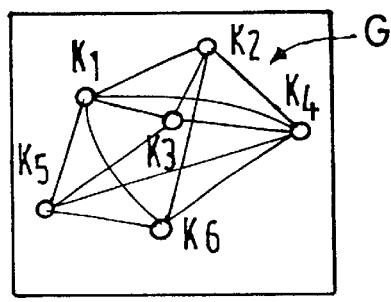
FIG. 8 illustrates a graph construction in the AHC step.

In a first operation 44, the K Classes returned by K-means are stored in the shape of a graph G. As shown in FIG. 8, each previously determined Class of points, denoted K1, K2, K3, K4, K5 . . . is represented as a nod in the graph G. In this graph, each nod is connected to an other nod by an arc which represents a merging relation between these nods, so forming pairs of nods.

A merging operation 45 is contemplated between two nods connected by an arc under a condition that merging criterions are fulfilled. So, said Classes K1, K2, K3, K4, K5 . . . , are visited and their points are examined according to a merging criterion, which may be that Classes of a pair are allowed to merge when they present the smallest standard distance deviation with respect to the barycenter in the new Class formed by merging said Classes of the pair. This standard distance deviation measures the new dispersion of the points in the new Class with respect to the new barycenter.

Figure 4:
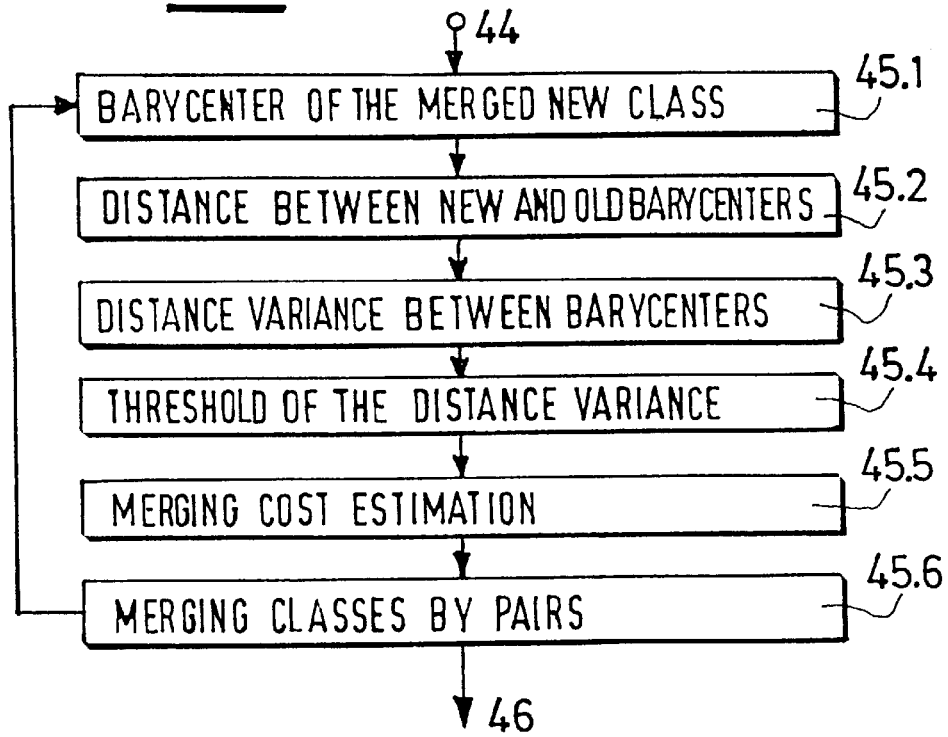
FIG. 4 is a functional block diagram of detailed AHC steps of the method.

In reference to FIG. 4, for carrying out this criterion, this operation 45 of the AHC algorithm may comprise the following sub-operations: determination 45.1 of the barycenter of the new Class resulting from merging two Classes of a pair; calculation 45.2 of the squared distance difference between the new barycenter and the previous barycenter for each point of a Class involved in the merging operation; calculation 45.3 of the mean value from these squared distances, which provides the distance variance of the points involved in the merging operation with respect to the new barycenter; threshold 45.4 of the distance variance; classes that are not apt to merge because their points does not fulfil the criterion are eliminated. So these pairs of Classes are no more considered; merging cost estimation 45.5 the merging cost represents the inertia increase between two Classes taken separately and the new Class born of the Class pair merging; merging operation 45.6 of Class pairs that further show the smallest merging cost among the Class pairs whose points fulfil the criterion of distance variance. The merging sub-operations 45.1 to 45.6 of operation 45 are repeated until whether there is no more pairs containing clusters apt for merging or the final number of clusters obtained after a number of merging operations is inferior to a predetermined threshold.

Key-Points RKP determination 46 in Reference Image RI, as illustrated by FIG. 3. This step enables to select the most representative points of the object and to ensure good noise immunity. The barycenters of the final Classes resulting from the merging operation 45.6 are referred to as Reference Image Key-Points RKP considered for the further steps of the method. They permit of extracting the most useful information from the Reference Object to follow in the sequence. In the example of the heart left ventricle contour, the parts of the contour that are quite flat are represented by only one point whereas the parts of the contour that are less regular are represented by several points.

Figure 5:
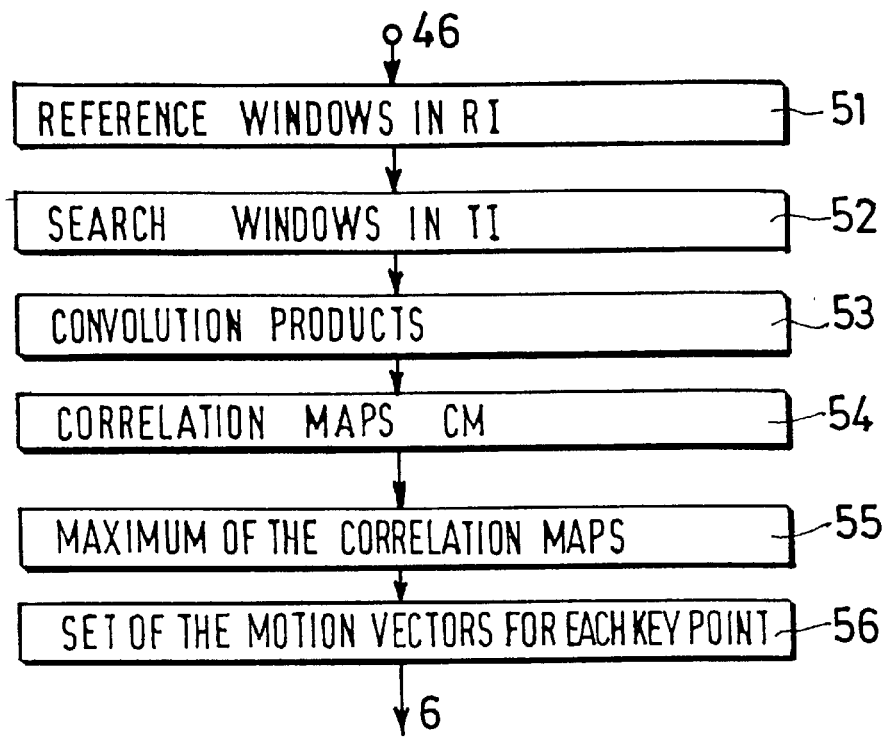
FIG. 5 is a functional block diagram of block-matching steps of the method.
Figure 9:
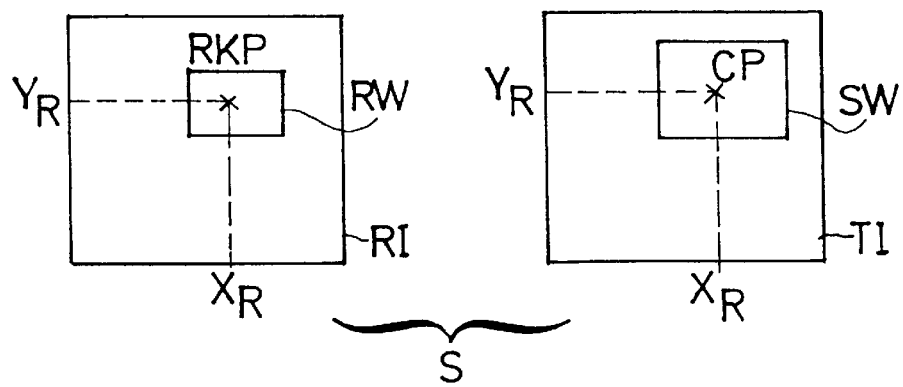
FIG. 9 illustrates the block-matching step of the method.
Figure 10:
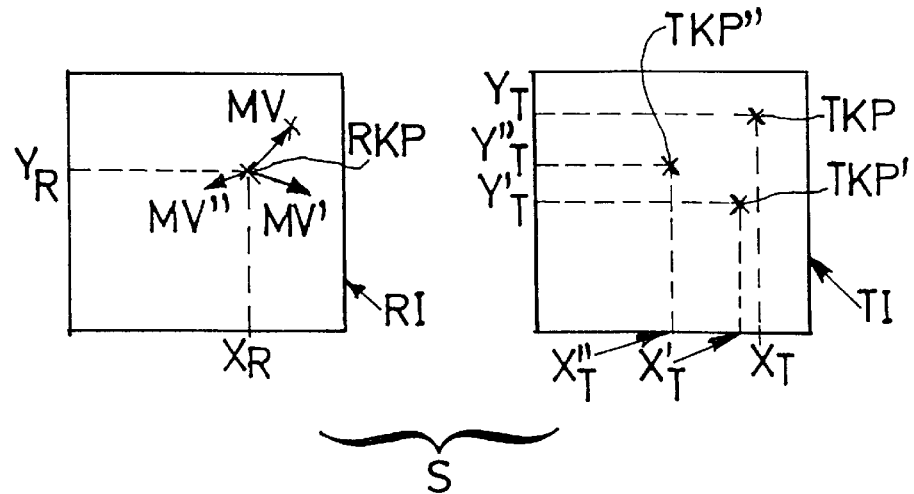
FIG. 10 shows the building of correlated points from a set of motion vectors.

As shown in FIG. 2, step 300 now comprises:

Determination 5 of one set of Motion Vectors MV for each Reference Key-Point comprising the creation of Correlation Maps CM. Referring to FIG. 9, the Reference Key-Points RKP are considered in the Reference Image RI, and corresponding Key-Points, referred to as Target Key-Points TKP, are searched for in the Target Image TI. To that end, a Block Matching Technique is used in order to determine, for all Reference Key-Points RKP of the Reference Object RO, the most likely points to constitute corresponding Target Key-Points TKP of the Target Object TO. The block Matching Technique permits of comparing the neighborhood of the Reference Key-Points RKP in the Reference Image RI to the Target Image TI in order to determine the most probable Target Key-Points TKP. Referring to FIG. 5, the Block Matching algorithm used in the present method comprises sub-steps of:

generation 51 of a convolution kernel that is created within the Reference Image RI: The kernel, referred to as Reference Window RW, is applied around a given Reference Key-Point RKP in the Reference Image RI;

generation 52 of a Search Window SW: Said kernel is taken with a ratio factor, and applied to the Target Image TI, thus defining a neighborhood, referred to as Target Search Window SW, around a point denoted CP having the same location in the Target Image as said given Reference Point in the Reference Image. So, for a Reference Key-Point RKP at coordinates $X_R$, $X_R$ in the Reference Image RI, a copy point CP at coordinates $X_R$, $Y_R$ is considered in the Target Image TI. A Reference Window RW and a Target Search Window SW are formed respectively around the Reference Key-Point KP and the copy point CP in the Target image. The Reference Window has for instance dimensions $2\Delta X$ and $2\Delta Y$ around the co-ordinates $X_R$, $X_R$ of KP, while the Target Search Window has dimensions $2r\Delta X$ and $2r\Delta Y$ around the copy point CP, with $\Delta X$, $\Delta Y \approx 20$ pixels and the ratio factor $r \approx 1$. In variants, the Reference and Target Search Windows may be circular or of other forms;

calculation 53 of convolution products between the Reference Window and the Search Window: The Reference and Search Windows are scanned, and convolution products are formed between the corresponding scanned points of said Reference Window and Target Search Windows for a given Reference Key-Point;

calculation 54 of the Correlation Map, which is a matrix of the correlation between the Reference and Target Images in the neighborhood of the considered Reference Key-Point RKP. The convolution product values form the Correlation Map points related to said given Reference Key Point;

estimation 55 of the maximum convolution deviations in said Correlation Map CM. The Correlation Map absolute maximum is first determined. Then, a predetermined correlation ratio determines the limit within which relative maximum values may be accepted. A number of accepted maximum values may be limited. This provides a few maximum values in the Correlation Map related to one given Reference Key-Point RKP, for instance 1 to 5 maximum values referred to as data points;

determination 56 of a set of Motion Vectors per Reference Key-Point: As illustrated by FIG. 10, to each of said data points, is associated Motion Vectors, respectively MV, MV', MV", . . . , of possible movements of said one given Reference Key-Point RKP between the Reference Image and the Target Image, whose characteristics are given by corresponding data points found in the Correlation Map. Correlation Maps are formed for all Reference Key-Points and one set of Motion Vectors of possible movements is respectively associated to each of said Reference Key-Points.

As shown in FIG. 2, step 300 further comprises:

Determination 6 of correlated points in the Target Image: In reference to FIG. 2 and FIG. 10, using for instance the set of motion vectors MV, MV', MV" related to a given Reference Key-Point RKP in the Reference Image RI, a set of possible Target Key-Points, denoted TKP, TKP', TKP" . . . , may be found in the Target Image TI.

Figure 11:
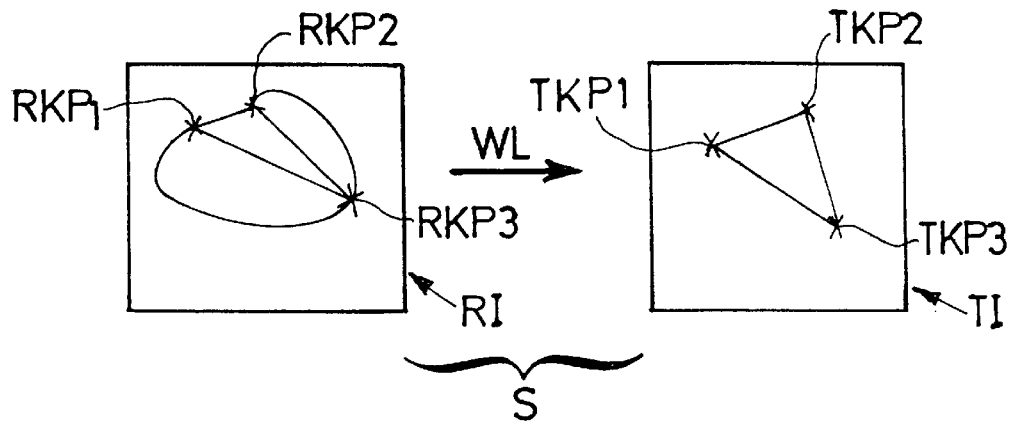
FIG. 11 shows the construction of correlated triplets from correlated points.

Now, as shown in FIG. 2, steps 200 and 300 comprise respective determinations 7A, 7B of m-plets of Reference Key-Points and of correlated m-plets of Target Key-Points for forming Pairs of Reference and Target m-plets. In reference to FIG. 11, this may be done in a 2-D space by considering the Reference Key-Points by three, thus forming a triplet of Reference Key-Points, such as RKP1, RKP2, RKP3, referred to as Reference Triplet, which may be represented by a triangle. Considering the set of Motion Vectors previously determined in step 5, it results that the Reference Key-Points forming said Reference Triplet move between the Reference Image and the Target Image in such a way as there is at least one corresponding correlated Target Triplet in the Target Image, referred to as TKP1, TKP2, TKP3, whose Target Key-Points TKP1, TKP2, TKP3 are correlated respectively to Reference Key-Points RKP1, RKP2, RKP3. This Reference and Target Triplets are hereafter referred to as a Pair of Triplets. In a second example when the Reference Object is in a sequence of 3-D images, the Reference Key-Points are associated in sets of four points, so forming a Reference Quadruplet representing a tetrahedral, to which correspond a correlated Target Quadruplet formed by applying the Motion Vectors to the Reference Key-Points. This Reference and Target Quadruplets are hereafter referred to as a Pair of Quadruplets. In the term m-plets, part "m-" is for "tri-" or "quadru-", according to the number of associated Key-Points.

Then, step 400 comprises a determination 8 of sets of parametric functions for transforming the m-plets of Reference Key-Points into the m-plets of Target Key-Points.

According to the invention, the Warping Law WL for transforming the Reference Object into the Target Object is a parametric function. It is first assumed for simplicity of the present description that this Warping Law is an affine function having 6 parameters in a 2-D space. The invention aims at determining those parameters. Once the 6 parameters are determined, the Warping Law may be determined. However, the invention provides a method for an accurate determination.

Let the co-ordinates of a possible Target Key-Point be $X_T$, $Y_T$. This affine function links these coordinates of the Target Key-Point to those of the correlated Reference Key-Point using two relations having 6 unknown values of parameters: a, b, c, d, e, f, so:

$$X_T = a\,X_R + b\,Y_R + c \tag{1a}$$

$$Y_T = a\,X_R + e\,Y_R + f \tag{1b}$$

Those skilled in the art may instead use non linear transformations whose relations comprises terms $X_R^2$, $Y_R^2$ or even $X_R^3$, $Y_R^3$. The solution to those transformations of high order may be carried out by using steps derived from the technique described hereafter to solve the affine relations of the first order having only 6 unknown parameters.

For determining 6 parameters, it is necessary to dispose of 6 relations instead of only the two relations (1a), (1b). According to the invention, that is made possible by considering no more one pair of correlated Key-Points, but instead by considering one Pair of m-plets, whose number of correlated Key-Points is sufficient to write as many equations as there are parameters to determine.

So, in 2-D space, a given Pair of Triplets is considered. Said Pair of Triplets provides a set of 6 equations having the 6 parameters for unknown data. Solving this first set of 6 equations permits of estimating a first set of 6 parameters.

For the first correlated Key-Points of said Pair of Key-Points Triplets:

$$X_{1T} = a\,X_{1R} + b\,Y_{1R} + c \tag{1a}$$

$$Y_{1T} = d\,X_{1R} + e\,Y_{1R} + f \tag{1b}$$

For the second correlated Key-Points of said Pair of Key-Points Triplets:

$$X_{2T} = a\,X_{2R} + b\,Y_{2R} + c \tag{2a}$$

$$Y_{2T} = d\,X_{2R} + e\,Y_{2R} + f \tag{2b}$$

For the third correlated Key-Points of said Pair of Key-Points Triplets:

$$X_{3T} = a\,X_{3R} + b\,Y_{3R} + c \tag{3a}$$

$$Y_{3T} = d\,X_{3R} + e\,Y_{3R} + f \tag{3b}$$

In the set of 6 equations (1a) to (3b), each parameter among a, b, c, d, e, f, is unique. This first set of 6 parameters is considered as a point denoted Parameter Point Q defined by its co-ordinates (a, b, c, d, e, f) in a multidimensional 6-D space.

When the three Reference Key-Points forming said given Reference Triplet have several Motion Vectors, there may be found several possible Target Triplets correlated to said given Reference Triplet, forming several Pairs of Triplets. Thence, equations (1a) to (3b) may be written with the other co-ordinates of $X_T$, $Y_T$ related to those other Pairs of Triplets. Assuming as a matter of example that three Pairs of Triplets are formed, three sets of 6 equations may be written and three sets of 6 parameters may be found, which is as many sets as there are Motion Vectors. The solution of each set of 6 equations provides one Parameter Point Q(a, b, c, d, e, f) in the 6-D space. So, these three sets of equations (1a) to (3b), related to the three possible Pairs of Triplets, provide three Parameter Points Q(a, b, c, d, e, f), which may be slightly different, in this 6-D space. In each set of 6 equations of the form (1a) to (3b), based on one Pair of Triplets, the parameters a, b, c, d, e, f, are made unique: it is the reason why it is possible to construct one unique Parameter Point Q(a, b, c, d, e, f) per Pair of Triplets.

Also, in the 2-D space of the Reference and Target Images, an other set of three Reference Key-Points may be considered, thus forming a second given Reference Triplet and hence a second Pair of Triplets, which provides a second set of 6 equations having 6 parameters a, b, c, d, e, f, for unknown data. The solution of these 6 equations provides a new Parameter Point Q(a, b, c, d, e, f) in the previously defined multidimensional 6-D space. Now, given one Reference Triplet of Key-Points, with a certain number of Motion Vectors related to said Key-Points, it results that it is possible to construct the same number of Pairs of Triplets. Then, the solution of the equations (1a) to (3b) related to said number of Pairs of Triplets provides as many 6-D Parameter Points Q(a, b, c, d, e, f) as there are possible Pairs of Triplets, which 6-D Parameter Points Q may be slightly different from one another. With combinations of most of the Reference Key-Points by sets of three to form Reference Triplets, and the taking into account of the previously determined Motion Vectors related to each Reference Key-Point, numerous corresponding possible Pairs of Triplets may be determined, thus permitting of writing a great number of sets of 6 equations and of providing a great number of sets of the 6 parameters for constituting the same great number of Parameter Points Q(a, b, c, d, e, f) in the multidimensional 6-D space.

In a second example when the Reference Object is in a sequence of 3-D images, the affine function has 12 unknown parameters. The Pairs of Quadruplets are used for providing 12 equations, similar to the equations (1), involving the co-ordinates of the correlated Key-Points, permitting of determining a set of the 12 parameters, which constitutes one Parameter Point Q in an appropriate multidimensional space. Now, for accurate determination of said parameters, it is useful to dispose of several sets, i. e. of several points Q in the multidimensional space. To that end, each 3-D Reference Quadruplet may supply several Pairs of Quadruplets, according to the number of Motion Vectors determined in step 5. Furthermore, each Reference Key-Point is associated in turn to three other Reference Key-Points, thus permitting of constituting different and numerous Pairs of Quadruplets, resulting in many more Parameter Points Q.

Step 400 further comprises the estimation 9 of the set of Parameter Points Q from the set of possible Pairs of m-plets described above, by solving the sets of equations related to said Pairs of m-plets. As explained above, there may be a great number of such Parameter Points Q. That is an advantage of the method of the invention: The great number of Parameter Points Q permits of generating a certain number of candidate Warping Laws, among which will be selected the Best Warping Law.

Figure 6:
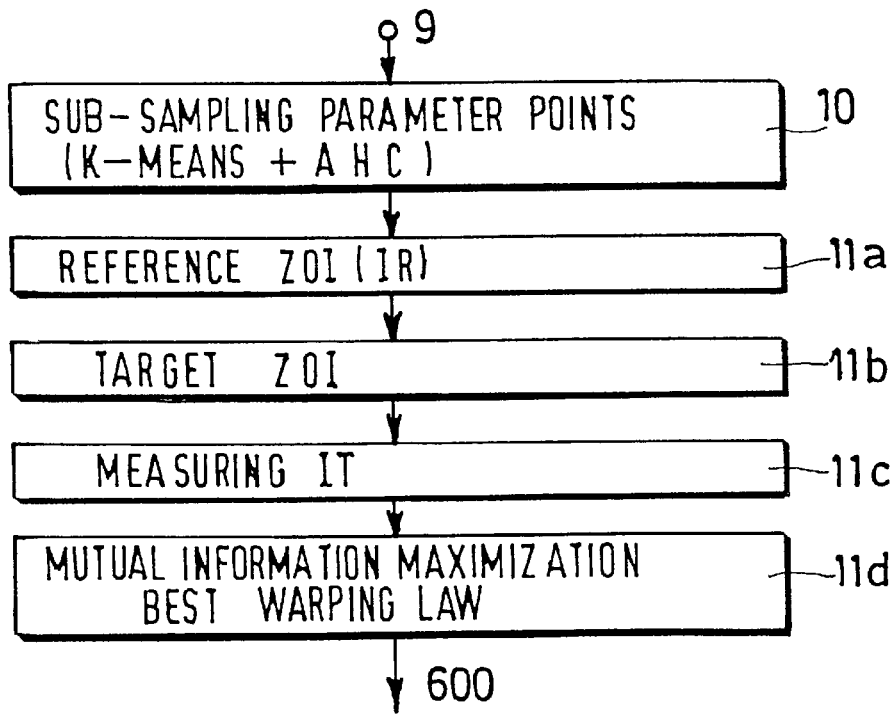
FIG. 6 is a functional block diagram of determination of a best Warping Law.

Step 500 now comprises a determination of said Best possible Warping Law as illustrated by FIG. 6. This step 500 comprises a sub-sampling operation 10 implying a Clustering Technique, which may have steps similar to those described above. Now, this Clustering Technique sub-samples the Parameter Points Q in the multidimensional space, which corresponds to sub-sampling candidate Warping Laws. For instance, this Clustering Technique comprises a K-means sub-step applied on the Parameter Points Q instead of the Reference Points of step 4. The K-means sub-step permits of selecting for instance 100 to 1,000 Parameter Points Q out of about possibly 10,000 Parameter Points Q present at the end of step 400. An Ascendant Hierarchical Classification AHC sub-step is further applied to the resulting 100 to 1,000 Parameter Points Q in order to select about 10 to 20 remaining Parameter Points Q, to which correspond as many remaining candidate Warping Laws.

Figure 12:
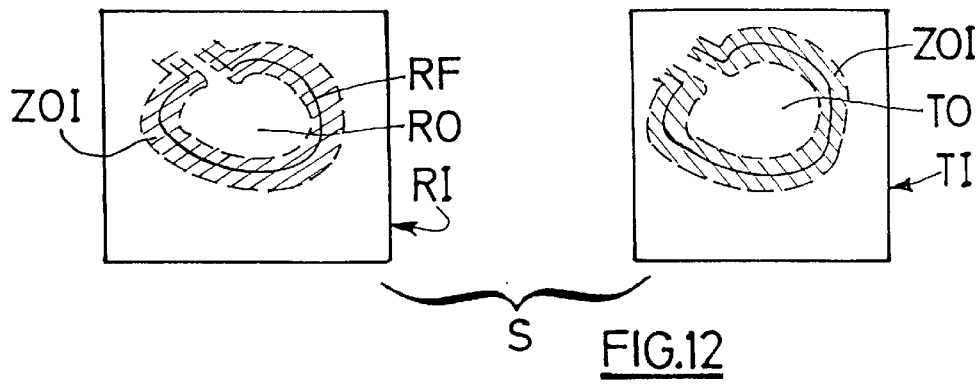
FIG. 12 illustrates the step of Mutual Information maximization.

Step 500 further comprises an operation 11 of selecting a Best Warping Law BWL from the number n=10 to 20 remaining candidate Warping Laws. This operation 11 is proposed robust to gray level changes in the images. This condition is set for palliating possible defects of the image sequence acquisition system, such as an X-ray system, which may provide variations of gray level between the sequence images due to the action of an automatic gain system. To that end, the operation 11 may be based on a criterion of Mutual Information. Operation 11 thus comprises sub-steps of:

determination 11a of Zones of Interest denoted ZOI around the Reference Points RP, which may be constituted by circles or spheres around the Reference Points, as illustrated by FIG. 12. The Zones of Interest are scanned in the Reference Image and the intensities IR of the points denoted R located in said Zones are measured;

determination 11b of co-ordinates of ZOI Target Points corresponding to the ZOI Reference Points, by applying each one of said n remaining Warping Laws to the coordinates of said Reference Points, thus determining n possible Target Zones of Interest formed of points denoted T in the Target Image;

measuring 11c the intensities IT of the ZOI Target Points T in the n possible Target Zones of Interest in the Target Image;

maximization 11d the measure of Mutual Information M(R,T) estimated between each of the n possible Target ZOI and the Reference ZOI according to a method known of those skilled in the art; a method for carrying out this step may be found in the publication entitled "Multimodality Image Registration by Maximization of Mutual Information" by Frederik MAES et alii in IEEE TRANSACTIONS ON MEDICAL IMAGING, VOL.16, NO.2, APRIL 1997. The intensity values IR and IT of the ZOI points denoted R in the Reference Image and denoted T in the Target Image are considered. The points R and T are corresponding points previously determined by one of the remaining candidate Warping Law. This step comprises an estimation of the fraction $p_{R,T}$(IR, IT) of said points R,T that have given intensities IT, IR, an estimation of the fraction $P_R$(IR) of said points R that have the intensity IR and an estimation of the fraction $p_T$(IT) of said points T that have the intensity IT. These fraction estimations may be obtained by constructing one normalized 2-D histogram of the (IR,IT) joint values and two normalized 1-D individual histograms of (IR) and (IT) individual values at said points R, T of the ZOI in the Reference and Target Images. The Mutual Information criterion states that the Object of Interest is to be found aligned in the Reference and Target Images by the considered Warping Law, when a measure, referred to as KULLBACK-LEIBLER measure, is maximal:

$$M(R,T) = \Sigma p_{R,T}(IR,IT) \log(p_{R,T}(IR,IT)/p_R(IR).p_T(IT))$$

Said measure M(R,T) is related to the entropy by the relation:

$$M(R,T) = H(R) + H(T) - H(R,T)$$

with H(R) and H(T) being the entropy of R and T, respectively, and H(R,T) being their joint entropy. This equation M(R,T) measures the quality of the matching of the points R, T using the considered Warping Law. Said maximal measure corresponds to the best matching, which is provided by the Best Warping Law. So, the estimation of the maximum of said measure permits of determining, among the remaining candidate Warping Laws, said Best Warping Law which is robust to intensity variations.

In a step 600, this Best Warping Law is applied to all the Reference Points of the Reference Object in the Reference Image and provides a Target Object in the Target Image, which permits of better visualizing the actual Target Object. For example, when the Reference Points are contour points, then the contour points of the Target Object are determined, thus permitting of better locating and visualizing said Object of Interest. The Target Image is further taken as a Reference Image for determining a new Warping Law according to steps 100 to 600, for following the Object of Interest in a subsequent Image of the image sequence and then throughout the whole image sequence from one image to the next image.

Figure 13A:
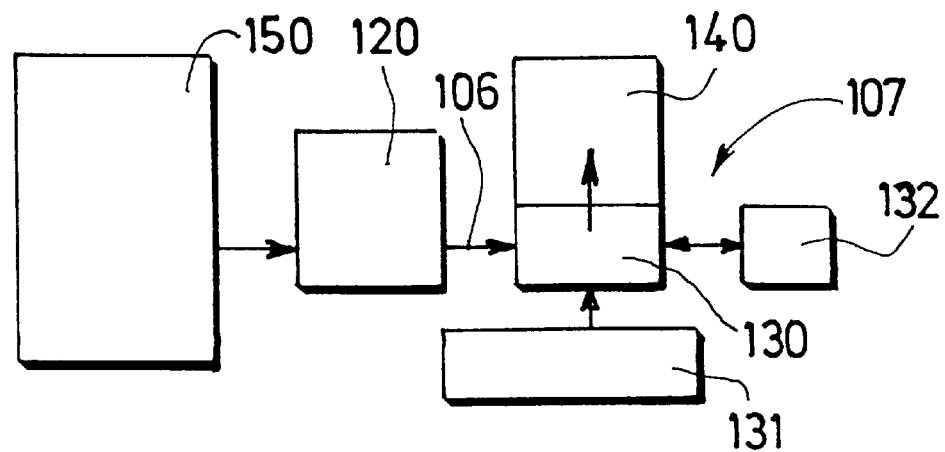
FIG. 13A is a functional block diagram illustrating an examination apparatus having a processing system and means for carrying out the method of the invention and FIG. 13B illustrates an X-ray apparatus associated to such a processing system.

Referring to FIG. 13A, image data of a sequence of images, provided for instance by a medical examination apparatus 150, may be further provided to an image processing system 120 for processing the data according to the method of the invention. This image processing system 120 may be a suitably programmed computer of a workstation 130 having a screen 140, or a special purpose processor having circuit means such as LUTs, Memories, Filters, Logic Operators, that are arranged to perform the functions of the method steps according to the invention. The workstation 130 may also comprise a keyboard 131 and a mouse 132. The processing system may be connected to storing means to store the medical images.

Figure 13B:
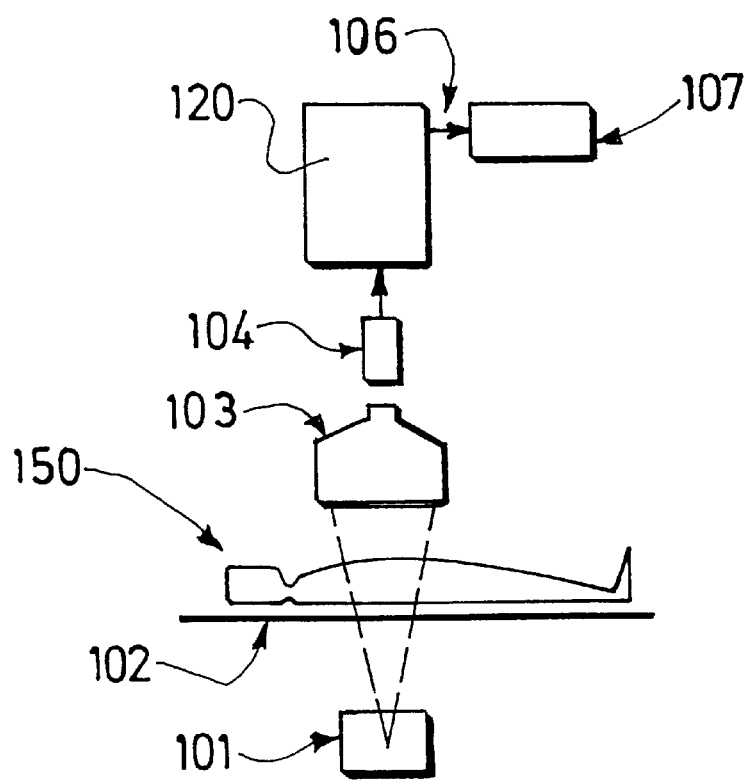

A medical X-ray apparatus as represented on FIG. 13B may comprise acquisition means for acquiring digital medical image sequence data and digital processing means for processing these data for following an Object of Interest throughout the image sequence according to the processing method described above. The X-ray apparatus comprises an X-ray source 101, a table 102 for receiving the patient, an optical system 103, 104 for providing image data to the processing means 105. The processing means may be a processor having digital calculation means for processing the data and having storing means such as memories for storing the data. The processing means may also have at least one output 106 coupled to display means comprising a screen 107 to display the medical original images and the processed medical images, in such a way that the displayed processed images may help the practitioner to visualize said Object of Interest.

What is claimed is:

1. An image processing method for processing images of an image sequence representing an Object of Interest having possible movements, wherein the possible movements of the Object of Interest from a first image to a second image of the sequence is described, and the Object of Interest is located in the second image of the sequence, the method comprising the steps of:
   defining first points of the Object of Interest in the first image,
   determining points correlated to said first points, referred to as second points, found in the second image,
   acquiring image data of the first and second points,
   determining a set of a given number of parametric functions, which transform first points into correlated second points?
   calculating the parameters of said parametric functions, and
   estimating one general parametric law, referred to as Warping Law, using said parameters to automatically transform said given Object of Interest of the first image into the same object in the second image of the sequence.

2. An image processing method as claimed in claim 1, further comprising:
   determining sets of a given number of parametric transformation functions having the same given number of unknown parameters, which respectively link the co-ordinates of first points to the co-ordinates of correlated second points, and
   solving each set of the given number of parametric functions with respect to their parameters for estimating corresponding sets of parameters, in order to determine said Warping Law.

3. An image processing method as claimed in claim 2, further comprising estimating points in a multidimensional space, referred to as Parameter Points, each of said Parameter Points having for co-ordinates the parameters estimated from the solution of one set of parametric function.

4. An image processing method as claimed in claim 3, further comprising:
   determining pairs of a number (m) of correlated first and second points between the first and the second images, referred to as m-plets, said correlated points of each pair of m-plets being linked by a set of as many parametric functions as these functions have of unknown parameters, and
   solving each of these sets of parametric functions in order to estimate, for each set, one set of parameters, which are the co-ordinates of one Parameter Point in the multidimensional space.

5. An image processing method as claimed in claim 4, wherein said step of determining n that the pairs of m-plets are pairs of triplets or quadruplets of correlated first and second points, according to the image sequence space being a 2-D or a 3-D space, and wherein said step of solving includes that-the parametric transform functions are affine functions.

6. An image processing method as claimed in claim 3, further comprising sub-sampling the Parameters Points in the multidimensional space to a predetermined number of said Parameter Points, and
   estimating a corresponding number of candidate parametric Warping Laws having the respective co-ordinates of the sub-sampled Parameter Points as parameters.

7. An image processing method as claimed in claim 6, further comprising applying a Clustering Technique to the Parameters Points in the multidimensional space, for sub-sampling said Parameter Points, including K-means algorithm and Ascendant Hierarchical Classification AHC.

8. An image processing method as claimed in claim 6, further comprising maximizing of Mutual Information based on relative entropy between the Reference Image and the Target Image for selecting a Best Warping Law from the candidate parametric Warping Laws.

9. An image processing method as claimed in claim 1, further comprising a step of selecting points of the Object of Interest, referred to as Key-Points, for forming said first points and of determining said correlated second points by using a block matching technique applied between the first and second images for providing one Correlation Map relative to each Key-Point, in which Correlation Map, one to several best correlated points are selected in the second image as a set of correlated second points related to said Key-Point.

10. An image processing method as claimed in claim 9, wherein the step of selecting points includes that the Key-Points are selected from specific points of the Object of Interest, such as contour points, by using a Clustering Technique including K-means and Ascendant Hierarchical Classification AHC algorithms.

11. A system comprising a suitably programmed computer of a workstation or a special purpose processor having circuit means, which are arranged to process image sequence data according to the method as claimed in claim 1, and having means for displaying images processed according to said method, and means for storing the image data.

12. A system as set forth in claim 1 and further including an X-ray examination medical apparatus having means for acquiring medical digital image sequence data, wherein said system has access to said medical digital image sequence data for processing, displaying said image data and storing said image data.

13. A computer program product comprising a set of instructions for carrying out a method as claimed in claim 1.

* * * * *